$$R_A = VR_A - \Delta R_A$$
$$T_f = VT_f + \Delta T_f$$

INVENTOR
HOWARD E. LUSTIG.
BY Borst & Borst
ATTORNEYS

United States Patent Office 3,029,017
Patented Apr. 10, 1962

3,029,017
BOMB COMPUTER
Howard E. Lustig, Flushing, N.Y., assignor to The Sperry Rand Corporation, Long Island City, N.Y., a corporation of Delaware
Filed Jan. 25, 1960, Ser. No. 4,313
1 Claim. (Cl. 235—61.5)

This application is a continuation-in-part of my application having Serial No. 579,294, now abandoned, which was filed on April 19, 1956.

This invention relates to a bomb ballistics computer for determining time of flight and range for bomb trajectories, the capacity of the computer for accommodating different bomb types being controlled by means for adjusting the values of two input quantities, namely the time and range ballistics coefficients for the particular bomb.

The computer mechanism is uniquely arranged according to the mathematical computations performed by the various components for the theoretical determination of the desired quantities in a vacuum and for the lagging effect on those quantities produced by actual conditions. The lag effect is mechanically ascertained for standard altitudes and modified in accordance with the altitude at release. The input values are normally computed in other sections of the computer except for the known ballistics coefficients which are special to the weapon and are therefore the only inputs introduced independently of the other sections of the computer. This permits the use of the computer for all types of bombs within certain coefficient limitations.

The mechanism embodying the preferred form of invention will be better understood on reading the following detailed description in conjunction with the accompanying drawings, in which—

Figure 1:
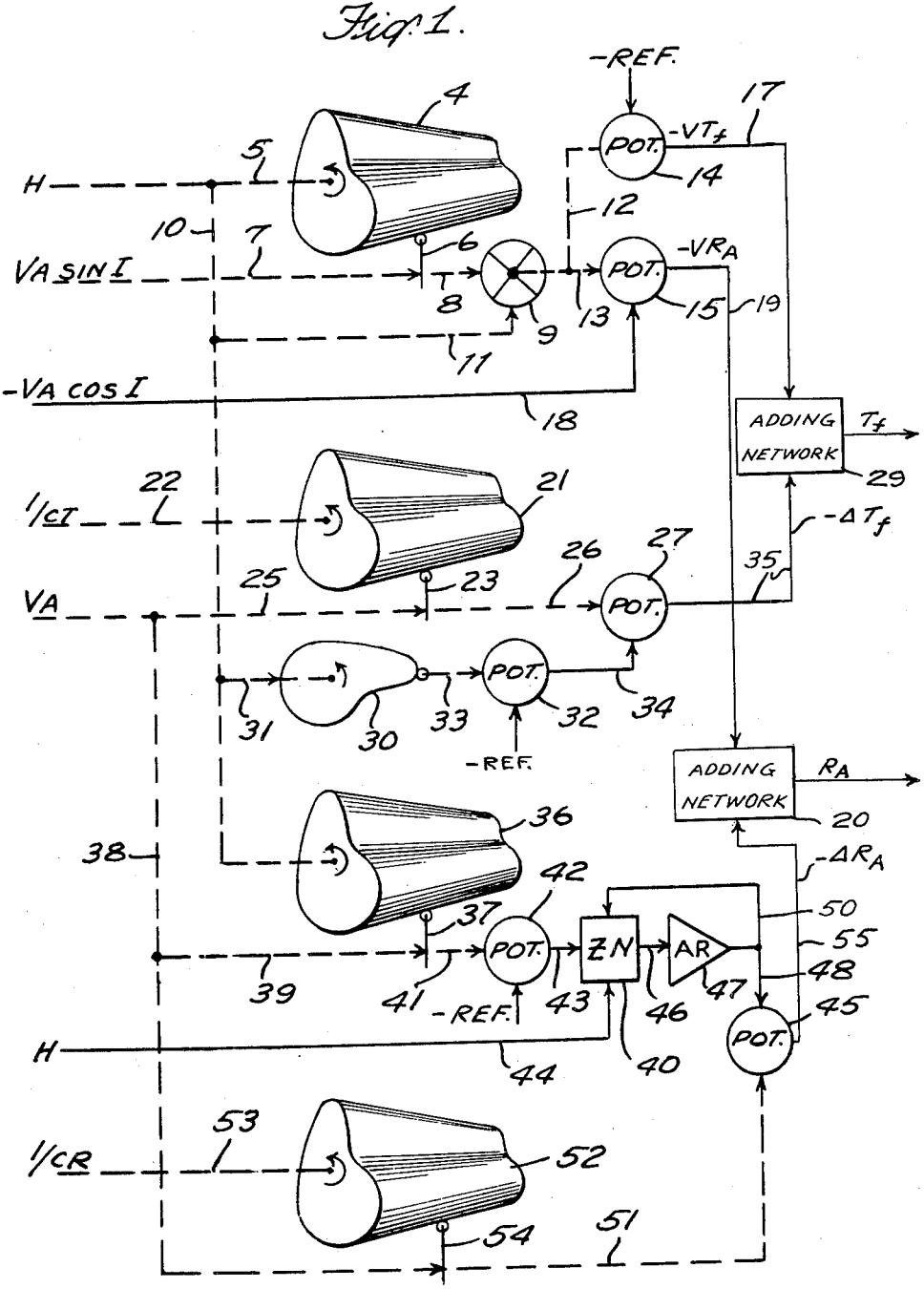
Figure 2:
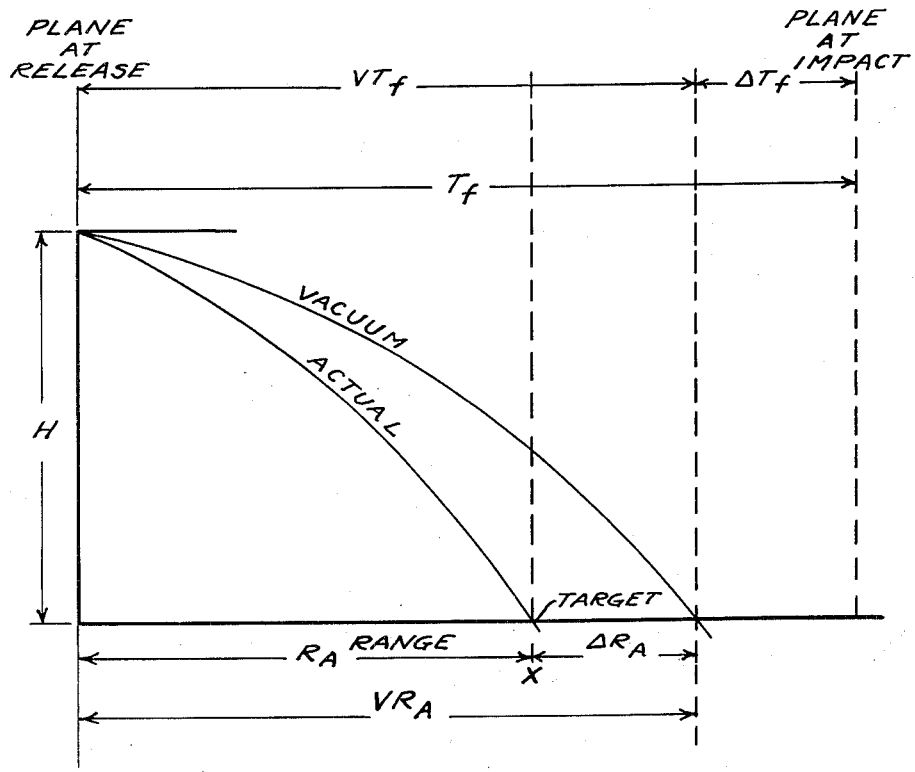

FIG. 1 is a schematic of the bomb computer, in which dash lines represent mechanical inputs and solid lines represent electrical quantities; and FIG. 2 illustrates the problem solved by same.

As shown in FIG. 1 there is provided a function generator 4 in the form of a ballistics cam having an input shaft 5 coincident with its axis of rotation for introducing altitude H and a cam follower 6 axially positioned by shaft 7 which introduces vertical components of air speed $V_A \sin I$. The surface of the function generator 4 is cut so as to yield a function of altitude and speed. The function yields values which closely accord with the theoretical values for vacuum time of flight $VT_f$ for the particular input quantities. Actually the function is taken with respect to an offset proportional to altitude instead of a horizontal coordinate in order to permit a greater range for the function and therefore the altitude is added to the output of the cam to produce the true values of $VT_f$. Accordingly cam output shaft 8, which is driven by cam follower 6 is connected to one side of a differential 9 the other input side of which is connected to the shaft 5 by shafts 10 and 11. The output of the differential 9 is placed on shafts 12 and 13 for introduction to potentiometers 14 and 15 respectively. The output of potentiometer 14 on lead 17 is then a negative electrical equivalent for vacuum time of flight, $-VT_f$, which is placed into adding network 29. It may be shown that the product of $VT_f$ and $-V_A \cos I$, horizontal component of airspeed, is proportional to vacuum range $-VR_A$ and therefore the potentiometer 15 is referenced by lead 18 on which there is placed the generated quantity for $-V_A \cos I$. The lead 19 connected to the potentiometer 15 receives the output, $-VR_A$, and introduces this quantity to the adding network 20.

Three dimensional cam 21 is rotatable on shaft 22 in accordance with the known values for the reciprocal of the time ballistic coefficient, $1/c_T$, and cam follower 23 therefor is axially positioned by means of shaft 25 in accordance with the computed values of airspeed. The cam output on shaft 26 which is employed to drive potentiometer 27 represents time lag at an altitude of 2000 feet. This quantity is modified for the actual altitude as follows: A single variable cam 30, driven in rotation by connected shafts 10 and 31, in accordance with altitude, H, mechanically introduces into potentiometer 32 on cam follower shaft 33 the computed function of altitude, H. The electrical equivalent is employed to reference the potentiometer 27 by means of connecting lead 34. The output lead 35 for the potentiometer 27 will then represent time lag $-\Delta T_f$, which is then placed into the adding network 29 which yields a time of flight $T_f$ to the output.

The shaft 10 is also employed to angularly position three dimensional cam 36 in accordance with computed values for altitude, H. Cam follower 37 is positioned axially of the cam 36 by means of airspeed shaft 25 through shaft 38 and cam follower shaft 39. The cam output is placed into adding network 40 by means of cam output shaft 41 which is provided to drive the potentiometer 42 which is connected to the adding network 40 by means of lead 43. An electrical quantity for altitude $-H$ is brought to the adding network 40 by means of lead 44 and this quantity is added to the output of the cam 36. The output of the adding network 40 is fed to a potentiometer 45 by means of amplifier lead 46, amplifier 47 and amplifier output connection 48. The amplifier output connection is also connected to the adding network 40 by feed back lead 50 in order to assure that the entire output of the network is placed in the potentiometer when the former has been nulled.

The potentiometer 45 is driven by means of shaft 51 to which there is fed the output of three dimentional cam 52. The cam 52 is rotatable on shaft 53 on which there is placed the quantity representing the reciprocal of the range ballistics coefficient $1/c_R$, the cam follower 54 for the three dimensional cam being axially positioned by means of the shaft 38 in accordance with the computed values for airspeed $V_A$. The output lead 55 of the potentiometer 45 then represents the product of the functions of cams 36 and 52 which is designated range lag $\Delta R_A$. The lead 55 is connected to the adding network 20 which is enabled thereby to yield computed values for range $R_A$ to the output.

As shown in FIG. 2 the theoretical and empirical quantities for range and time are combined to yield values representing actual range, $R_A$, which is defined as the horizontal distance between the release point R and the impact point or target X, and time of flight $T_f$, which may be defined as the elasped time during which the aircraft travels from the release point to its horizontal location at time of impact.

The combining operation may be easily effected by adding means (not shown) so that the quantities may be made available to the navigation section of the computer as time of flight and range.

The scope of the invention is defined by the following claim.

What is claimed is:

A ballistic computer for computing time of flight $T_f$ for any bomb for which the time ballistics coefficient is known in accordance with the equation, $$T_f = VT_f + \Delta T_f$$

where $VT_f$ is vacuum time of flight and $\Delta T_f$ is time lag at the release altitude comprising a function generator settable in accordance with values for altitude and the vertical component of airspeed, altitude adjusting means connected to said function generator whereby the output of said altitude adjusting means is vacuum time of flight, $VT_f$, a second function generator settable in accordance with the values for reciprocal of a time ballistic coefficient and airspeed, a third function generator settable in accordance with values for altitude, means for multiplying the output of said second and third function generator whereby the product on the output is time lag $\Delta T_f$ and an adding network connected to receive the quantities $VT_f$ and $\Delta T_f$ and adapted to produce time of flight $T_f$ and for computing range $R_A$ for any bomb for which the range ballistics coefficient is known in accordance with the following equation:

$$R_A = VR_A - \Delta R_A$$

where $VR_A$ is vacuum range and $\Delta R_A$ is range lag means comprising the first function generator, means connected to the output means of said first function generator settable in accordance with horizontal component of airspeed for multiplying the output of the first function generator and horizontal component of airspeed and placing the product in the output as vacuum range $VR_A$, a fourth function generator settable in accordance with values for altitude and airspeed, altitude adjusting means connected to the output of said fourth function generator, a fifth function generator settable in accordance with values for airspeed and the reciprocal of a range ballistics coefficient and means for multiplying the output of said fourth and fifth function generators whereby the product in the output is range lag $\Delta R_A$ and an adding network connected to receive the quantities $VR_A$ and $\Delta R_A$ and produce range $R_A$.

References Cited in the file of this patent

UNITED STATES PATENTS 2,371,606     Chafee _____ Mar. 20, 1945

OTHER REFERENCES

"Synthesis of Electronic Computing and Control Circuits" (Staff of the Computation Laboratory), published by the Harvard University Press (Cambridge, Mass.), 1951, page 200 relied on.

"Computing Mechanisms and Linkages" (Svoboda), published by McGraw-Hill (New York), 1948, page 33 relied on.